US012756451B2

(12) United States Patent
Raghavan et al.

(10) Patent No.: US 12,756,451 B2
(45) Date of Patent: Oct. 6, 2026

(54) INDICATING A POLARIZATION STATE CHANGE AT A USER EQUIPMENT (UE) IN ACCORDANCE WITH A CHANGE IN A UE'S GEOMETRIC CONFIGURATION

(71) Applicant: QUALCOMM Incorporated, San Diego, CA (US)

(72) Inventors: Vasanthan Raghavan, West Windsor Township, NJ (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 257 days.

(21) Appl. No.: 18/772,012

(22) Filed: Jul. 12, 2024

(65) Prior Publication Data

US 2026/0019139 A1 Jan. 15, 2026

(51) Int. Cl.
*H04B 7/10* (2017.01)
*H04B 7/06* (2006.01)

(52) U.S. Cl.
CPC ............. *H04B 7/10* (2013.01); *H04B 7/0617* (2013.01); *H04B 7/063* (2013.01)

(58) Field of Classification Search
CPC ........ H04B 7/10; H04B 7/0617; H04B 7/063; H04B 7/0469
See application file for complete search history.

(56) References Cited

U.S. PATENT DOCUMENTS

2020/0266875 A1* 8/2020 Zhou .................... H04B 7/0628
2022/0103241 A1* 3/2022 Petersson ............... H04B 7/043

OTHER PUBLICATIONS

Zhang, X., Wei, K., Li, Y. and Zhang, Z., 2023. A polarization reconfigurable antenna for satellite communication in foldable smartphone. IEEE Transactions on Antennas and Propagation, 71(12), pp. 9938-9943.*
Williams, D.E., Dorn, C., Pellegrino, S. and Hajimiri, A., 2021, January. Origami-inspired shape-changing phased array. In 2020 50th European Microwave Conference (EuMC) (pp. 344-347). IEEE.*

* cited by examiner

*Primary Examiner* — Zhitong Chen
(74) *Attorney, Agent, or Firm* — Qualcomm Incorporated/ Seyfarth Shaw LLP

(57) ABSTRACT

A method for wireless communication at a user equipment (UE) includes transmitting, to a network node, a first message indicating a uni-polarization communication state or a dual-polarization communication state of an antenna array architecture of the UE in accordance with the UE changing from a first geometric configuration to a second geometric configuration, or vice versa, the antenna array architecture forming a split antenna array associated with the uni-polarization communication state when the UE is configured according to the first geometric configuration, and a single antenna array associated with the dual-polarization communication state when the UE is configured according to the second geometric configuration. The method also includes transmitting, to the network node, a second message indicating one or more channel characteristics and one or more device characteristics associated with measurements of the one or more RSs received in accordance with transmitting the first message.

26 Claims, 10 Drawing Sheets

INDICATING A POLARIZATION STATE CHANGE AT A USER EQUIPMENT (UE) IN ACCORDANCE WITH A CHANGE IN A UE'S GEOMETRIC CONFIGURATION

FIELD OF THE DISCLOSURE

The present disclosure relates generally to wireless communications, and more specifically to indicating a polarization communication state change at a user equipment (UE) in accordance with a change in a UE's geometric configuration.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail, a BS may be referred to as a Node B, an evolved Node B (eNB), a gNB, an access point (AP), a radio head, a transmit and receive point (TRP), a new radio (NR) BS, a fifth generation (5G) Node B, and/or the like.

The above multiple access technologies have been adopted in various telecommunications standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

In some cases, a UE may have an adjustable form factor. For example, the UE may be a foldable UE or a flippable UE. In such cases, the form factor (for example, geometric configuration) of the UE may dynamically change. In most cases, a thickness of a conventional UE that does not have an adjustable form factor is limited to approximately three to four and a half millimeters (mm). For the adjustable form factor UE, the thickness may be limited to approximately mm. The thinness of the adjustable form factor UE presents a challenge for fitting dual-polarized antenna modules within the adjustable form factor UE. Such dual-polarized antenna modules may be specified to support frequency range two (FR2) (which constitutes 24.25-52.6 GHz) and frequency range three (FR3) (which constitutes 7.125-24.25 GHz). Therefore, some conventional adjustable form factor UEs may not support FR2 and FR3.

SUMMARY

In some aspects of the present disclosure, a method for wireless communication at a UE includes transmitting, to a network node, a first message indicating a uni-polarization communication state or a dual-polarization communication state of an antenna array architecture of the UE in accordance with the UE changing from a first geometric configuration to a second geometric configuration, or vice versa. The antenna array architecture may form a split antenna array associated with the uni-polarization communication state when the UE is configured according to the first geometric configuration, and a single antenna array associated with the dual-polarization communication state when the UE is configured according to the second geometric configuration. The method further includes receiving, from the network node, one or more reference signals (RSs) in accordance with transmitting the first message. The method also includes transmitting, to the network node, a second message indicating one or more channel characteristics and one or more device characteristics associated with measurements of the one or more RSs.

Other aspects of the present disclosure are directed to an apparatus. The apparatus includes means for transmitting, to a network node, a first message indicating a uni-polarization communication state or a dual-polarization communication state of an antenna array architecture of the UE in accordance with the UE changing from a first geometric configuration to a second geometric configuration, or vice versa. The antenna array architecture may form a split antenna array associated with the uni-polarization communication state when the UE is configured according to the first geometric configuration, and a single antenna array associated with the dual-polarization communication state when the UE is configured according to the second geometric configuration. The apparatus further includes means for receiving, from the network node, one or more RSs in accordance with transmitting the first message. The apparatus also includes means for transmitting, to the network node, a second message indicating one or more channel characteristics and one or more device characteristics associated with measurements of the one or more RSs.

In some other aspects of the present disclosure, a non-transitory computer-readable medium with program code recorded thereon is disclosed. The program code is executed by a processor and includes program code to transmit, to a network node, a first message indicating a uni-polarization communication state or a dual-polarization communication state of an antenna array architecture of the UE in accordance with the UE changing from a first geometric configuration to a second geometric configuration, or vice versa. The antenna array architecture may form a split antenna array associated with the uni-polarization communication state when the UE is configured according to the first geometric configuration, and a single antenna array associated with the dual-polarization communication state when the UE is configured according to the second geometric configuration. The program code further includes program code to receive, from the network node, one or more RSs in accordance with transmitting the first message. The program code also includes program code to transmit, to the network node, a second message indicating one or more channel characteristics and one or more device characteristics associated with measurements of the one or more RSs.

Other aspects of the present disclosure are directed to a UE comprising one or more processors, and one or more memories coupled with the one or more processors and storing processor-executable code that, when executed by the one or more processors, is configured to cause the UE to transmit, to a network node, a first message indicating a uni-polarization communication state or a dual-polarization communication state of an antenna array architecture of the UE in accordance with the UE changing from a first geometric configuration to a second geometric configuration, or vice versa. The antenna array architecture may form a split antenna array associated with the uni-polarization communication state when the UE is configured according to the first geometric configuration, and a single antenna array associated with the dual-polarization communication state when the UE is configured according to the second geometric configuration. Execution of the processor-executable code further causes the UE to receive, from the network node, one or more RSs in accordance with transmitting the first message. Execution of the processor-executable code also causes the UE to transmit, to the network node, a second message indicating one or more channel characteristics and one or more device characteristics associated with measurements of the one or more RSs.

In some aspects of the present disclosure, a method for wireless communication at a network node includes receiving, from a UE, a first message indicating a uni-polarization communication state or a dual-polarization communication state of an antenna array architecture of the UE in accordance with the UE changing from a first geometric configuration to a second geometric configuration, or vice versa. The antenna array architecture may form a split antenna array associated with the uni-polarization communication state when the UE is configured according to the first geometric configuration, and a single antenna array associated with the dual-polarization communication state when the UE is configured according to the second geometric configuration. The method further includes transmitting one or more RSs in accordance with transmitting the first message. The method also includes receiving, from the UE, a second message indicating one or more channel characteristics and one or more device characteristics associated with measurements of the one or more RSs.

Other aspects of the present disclosure are directed to an apparatus. The apparatus includes means for receiving, from a UE, a first message indicating a uni-polarization communication state or a dual-polarization communication state of an antenna array architecture of the UE in accordance with the UE changing from a first geometric configuration to a second geometric configuration, or vice versa. The antenna array architecture may form a split antenna array associated with the uni-polarization communication state when the UE is configured according to the first geometric configuration, and a single antenna array associated with the dual-polarization communication state when the UE is configured according to the second geometric configuration. The apparatus further includes means for transmitting one or more RSs in accordance with transmitting the first message. The apparatus further includes means for receiving, from the UE, a second message indicating one or more channel characteristics and one or more device characteristics associated with measurements of the one or more RSs.

In some other aspects of the present disclosure, a non-transitory computer-readable medium with program code recorded thereon is disclosed. The program code is executed by a processor and includes program code to receive, from a UE, a first message indicating a uni-polarization communication state or a dual-polarization communication state of an antenna array architecture of the UE in accordance with the UE changing from a first geometric configuration to a second geometric configuration, or vice versa. The antenna array architecture may form a split antenna array associated with the uni-polarization communication state when the UE is configured according to the first geometric configuration, and a single antenna array associated with the dual-polarization communication state when the UE is configured according to the second geometric configuration. The program code further includes program code to transmit one or more RSs in accordance with transmitting the first message. The program code also includes program code to receive, from the UE, a second message indicating one or more channel characteristics and one or more device characteristics associated with measurements of the one or more RSs.

Other aspects of the present disclosure are directed to a network node comprising one or more processors, and one or more memories coupled with the one or more processors and storing processor-executable code that, when executed by the one or more processors, is configured to cause the network node to receive, from a UE, a first message indicating a uni-polarization communication state or a dual-polarization communication state of an antenna array architecture of the UE in accordance with the UE changing from a first geometric configuration to a second geometric configuration, or vice versa. The antenna array architecture may form a split antenna array associated with the uni-polarization communication state when the UE is configured according to the first geometric configuration, and a single antenna array associated with the dual-polarization communication state when the UE is configured according to the second geometric configuration. Execution of the processor-executable code also causes the network node to transmit one or more RSs in accordance with transmitting the first message. Execution of the processor-executable code further causes the network node to receive, from the UE, a second message indicating one or more channel characteristics and one or more device characteristics associated with measurements of the one or more RSs.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
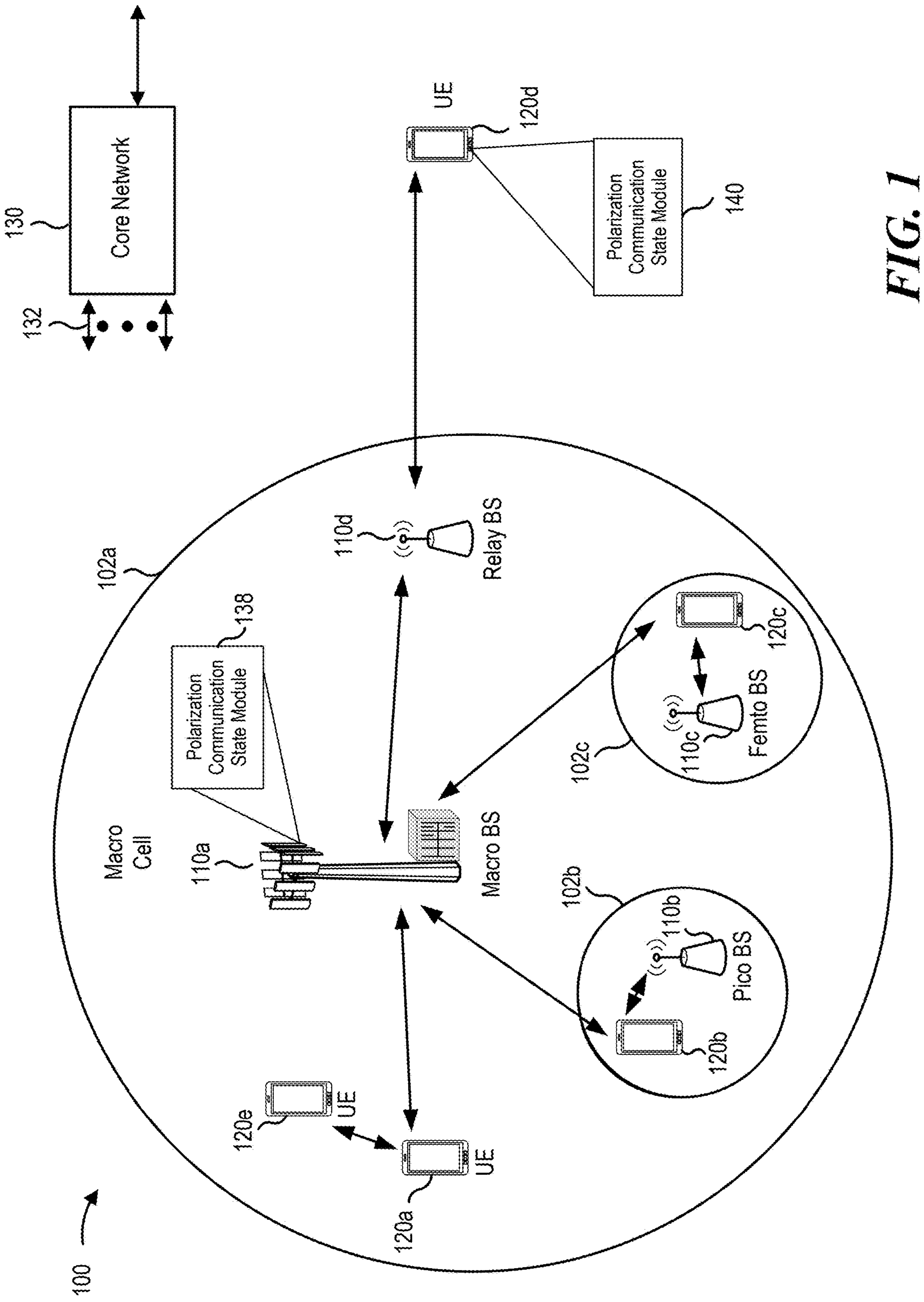
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G, 6G, and later wireless technologies, aspects of the present disclosure can be applied in other generation-based communications systems, such as and including 3G and/or 4G technologies.

An antenna module may include an array of antenna elements controlled by one or more radio frequency (RF) integrated circuit (RFIC) chip(s). In some cases, the antenna module may be a dual-polarized antenna module specified to transmit and receive signals in two orthogonal polarizations. In some other cases, the antenna module may be a uni-polarized antenna module specified to transmit and receive signals in a single polarization. Conventional dual-polarized antenna modules specified for millimeter wave frequencies are typically fixed and do not change form once deployed in a phone. The millimeter wave frequencies may include frequency range two (FR2) (24.25-52.6 GHz) and frequency range three (FR3) (7.125-24.25 GHz) frequency ranges. By using two orthogonal layers, the dual-polarized antenna module may lead to a doubling of a data communication rate with an antenna module using the same area or aperture in comparison to a uni-polarized antenna module. If a dual-polarized communication state is lost or deteriorated, the data communication rate is effectively halved.

In most cases, to satisfy radiation performance specifications, each unit cell, or radiating element, of an antenna module, may be at least 0.5 times a wavelength (λ) in both width and length, forming a dimension of 0.5λ×0.5λ. The radiating element refers to a unit of an antenna module that emits or receives signals. Specifying that a unit cell should have a 0.5λ×0.5λ dimension may ensure that a radiating element is large enough to radiate or capture signals at a desired frequency. As an example, at 30 GHz, the wavelength (λ) is approximately 10 mm, therefore, the dimensions of each unit cell for a dual-polarized antenna module may be 5 mm×5 mm. At lower frequencies, such as 13 GHz, the dimensions of each unit cell for the dual-polarized antenna module may be approximately 11.5 mm×11.5 mm.

A user equipment (UE) with an adjustable form factor (for example, foldable or flippable) may dynamically change from one geometric configuration to another geometric configuration. Additionally, depending on a hinge design and/or geometric configurations, the adjustable form factor UE may have intermediate form factors, creating variability in the form factor. In most cases, a thickness of a conventional UE without an adjustable form factor may be limited to 4 or 5 millimeters (mm). The thickness refers to the measurement of a distance between a front surface, such as a display unit, and a back surface of the UE. For UEs with an adjustable form factor, the thickness may be thinner (for example, approximately 3 mm). Such dimensions may fail to accommodate the dimensions of the dual-polarized antenna module for transmitting or receiving FR2 or FR3 signals. As a result, conventional adjustable form factor UEs may be limited to using a uni-polarized antenna module that only uses one polarization, thereby limiting the communication data rates.

In some examples, an adjustable form factor UE may overcome the discussed limitations associated with dual-polarized antenna modules through the use of an antenna array architecture that may form a split antenna array associated with the uni-polarization communication state when the UE is configured according to a first geometric configuration and a single antenna array associated with the dual-polarization communication state when the adjustable form factor UE is configured according to a second geometric configuration. The geometric configuration may also be referred to as a form factor (hereinafter used interchangeably). In such examples, when the adjustable form factor UE is in the first geometric configuration, the respective antenna arrays may be positioned on opposite sides of the adjustable form factor UE, operating independently in accordance with a uni-polarization communication state. The uni-polarization communication state refers to a state in which each antenna array transmits and receives signals in a single polarization direction. For example, the single polarization direction may be either vertical or horizontal, but not both simultaneously. In some such examples, when the adjustable form factor UE is in the first geometric configuration, the adjustable form factor UE may be in a closed state and one antenna array may be positioned on a front of the adjustable form factor UE and another antenna array may be positioned on a back of the adjustable form factor UE. In other such examples, when the adjustable form factor UE is in the first geometric configuration, the adjustable form factor UE may be in an open state and the respective antenna arrays may be positioned on opposing ends of the adjustable form factor UE. Additionally, in such examples, when the adjustable form factor UE is in the second geometric configuration, the previously separate antenna arrays may form into a single antenna array associated with the dual-polarization communication state. The dual-polarization communication state refers to a state in which the single antenna array may simultaneously transmit and receive signals in two orthogonal polarization directions. In some such examples, when the adjustable form factor UE is in the second geometric configuration, the adjustable form factor UE may be in an open state and the respective antenna arrays may be adjacent to each other. In other such examples, when the adjustable form factor UE is in the second geometric configuration, the adjustable form factor UE may be in a closed state and the respective antenna arrays may be adjacent to each other. This transition from the uni-polarized communication state to the dual-polarized communication state may be facilitated by the geometric reconfiguration of the adjustable form factor UE. The geometric reconfiguration may result from a physical change in the form factor resulting from, for example, folding or unfolding the UE, or opening or closing the adjustable form factor UE. Different frequency ranges and data communication rates may be supported by the uni-polarized communication state and the dual-polarized communication state.

To facilitate communication with a network node using the frequency ranges and the data communication rates supported by the uni-polarized communication state and the dual-polarized communication state, various aspects of the present disclosure are directed to the adjustable form factor UE dynamically indicating, to the network node, changes in a polarization communication state as the adjustable form factor UE transitions from one geometric configuration to another. In some examples, the adjustable form factor UE, transmits to the network node, a first message indicating a uni-polarization communication state or a dual-polarization communication state of an antenna array architecture of the adjustable form factor UE in accordance with the adjustable form factor UE changing from a first geometric configuration to a second geometric configuration, or vice versa. The first message further indicates a respective precoding matrix indicator (PMI) and respective rank information (RI) corresponding to the uni-polarization communication state or the dual-polarization communication state. The UE may then receive one or more reference signals from the network node in accordance with transmitting the first message. The one or more reference signals may be adjusted in accordance with the PMI and RI corresponding to the uni-polarization communication state or the dual-polarization communication state. The UE may then transmit, to the network node, a second message indicating one or more channel characteristics and one or more device characteristics associated with measurements of the one or more reference signals. The one or more device characteristics may indicate one or more of a device geometry, placement of an antenna array, or an amount of feedline loss over a radio frequency (RF) connector between respective antenna arrays of the split antenna array. There may be minimal to no feedline loss over the RF connector in the single antenna array configuration because the respective antenna arrays are positioned adjacent to each other. The device geometry may indicate physical dimensions of the UE. The placement of an antenna array may indicate the placement of antenna elements within the device geometry. The degree of feedline indicates the amount of signal loss that occurs when a signal travels through the RF connector between different parts of the antenna array.

Particular aspects of the subject matter described in this disclosure can be implemented to realize one or more of the following potential advantages. In some examples, the described techniques, such as indicating a uni-polarization communication state or a dual-polarization communication state of an antenna array architecture of the adjustable form factor UE may improve data throughput, reduce signal interference, and improve overall network performance by allowing the network to dynamically adapt signaling in accordance with geometric configuration changes at the adjustable form factor UE.

FIG. 1 is a diagram illustrating a wireless network 100 in which aspects of the present disclosure may be practiced. The wireless network 100 may be a fifth generation (5G) or new radio (NR) network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (for example, three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, and/or the like.

The wireless network 100 may be a heterogeneous network that includes BSs of different types (for example, macro BSs, pico BSs, femto BSs, relay BSs, and/or the like). These different types of BSs may have different transmit power levels, different coverage areas, and different impact on interference in the wireless network 100. For example, macro BSs may have a high transmit power level (for example, 5 to 40 watts) whereas pico BSs, femto BSs, and relay BSs may have lower transmit power levels (for example, 0.1 to 2 watts).

As an example, the BSs 110 (shown as BS 110*a*, BS 110*b*, BS 110*c*, and BS 110*d*) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a polarization communication state module 140. For brevity, only one UE 120*d* is shown as including the polarization communication state module 140. The polarization communication state module 140 may perform one or more operations, such as one or more operations of a process 800 described with reference to FIG. 8.

Figure 3:
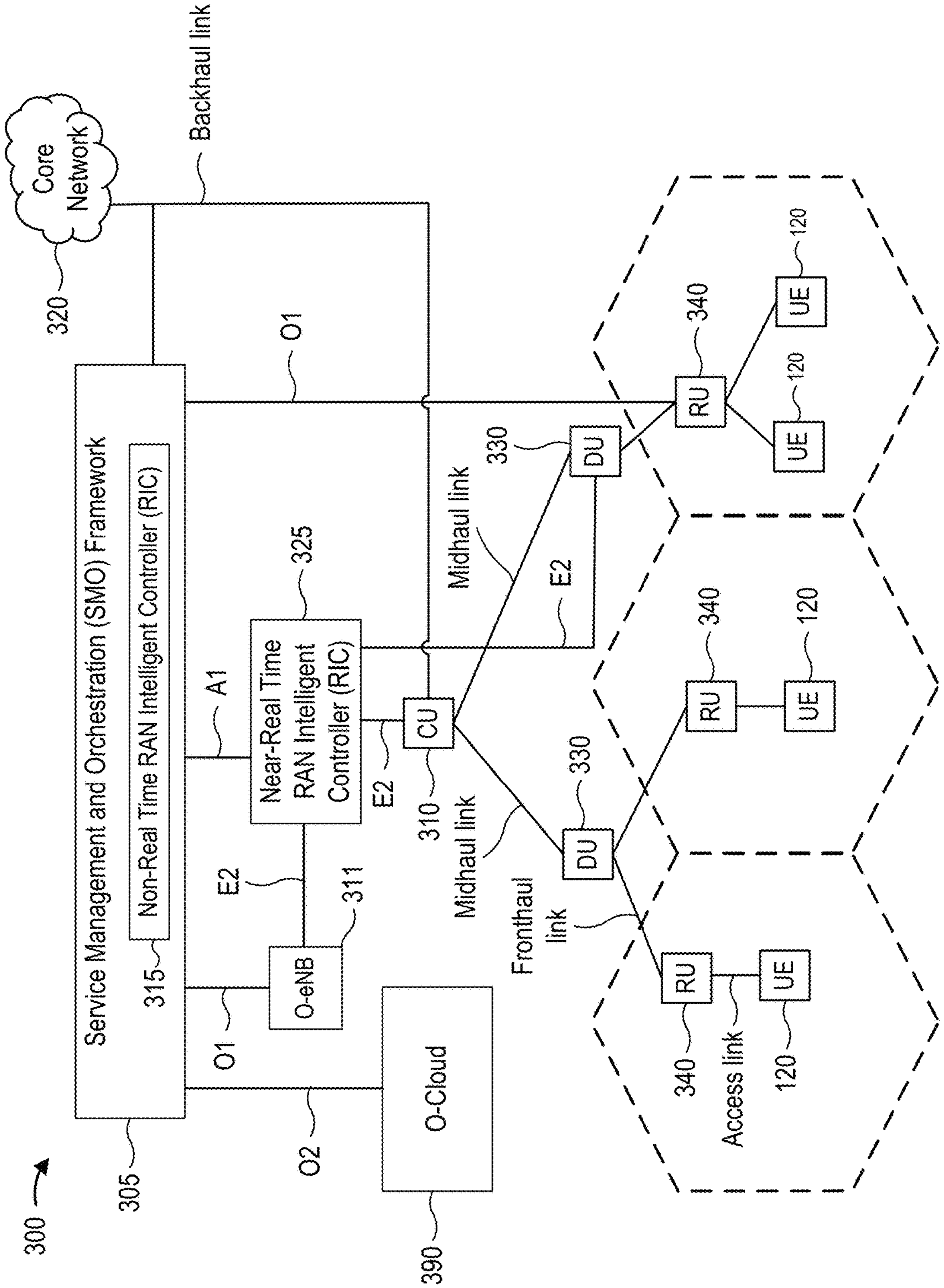
FIG. 3 is a block diagram illustrating an example disaggregated base station architecture, in accordance with various aspects of the present disclosure.

The core network 130 or the base stations 110 or any other network device (for example, as seen in FIG. 3) may include a polarization communication state module 138 that may perform one or more operations, such as one or more operations of a process 1000 described with reference to FIG. 10.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

As indicated above, FIG. 1 is provided merely as an example. Other examples may differ from what is described with regard to FIG. 1.

Figure 2:
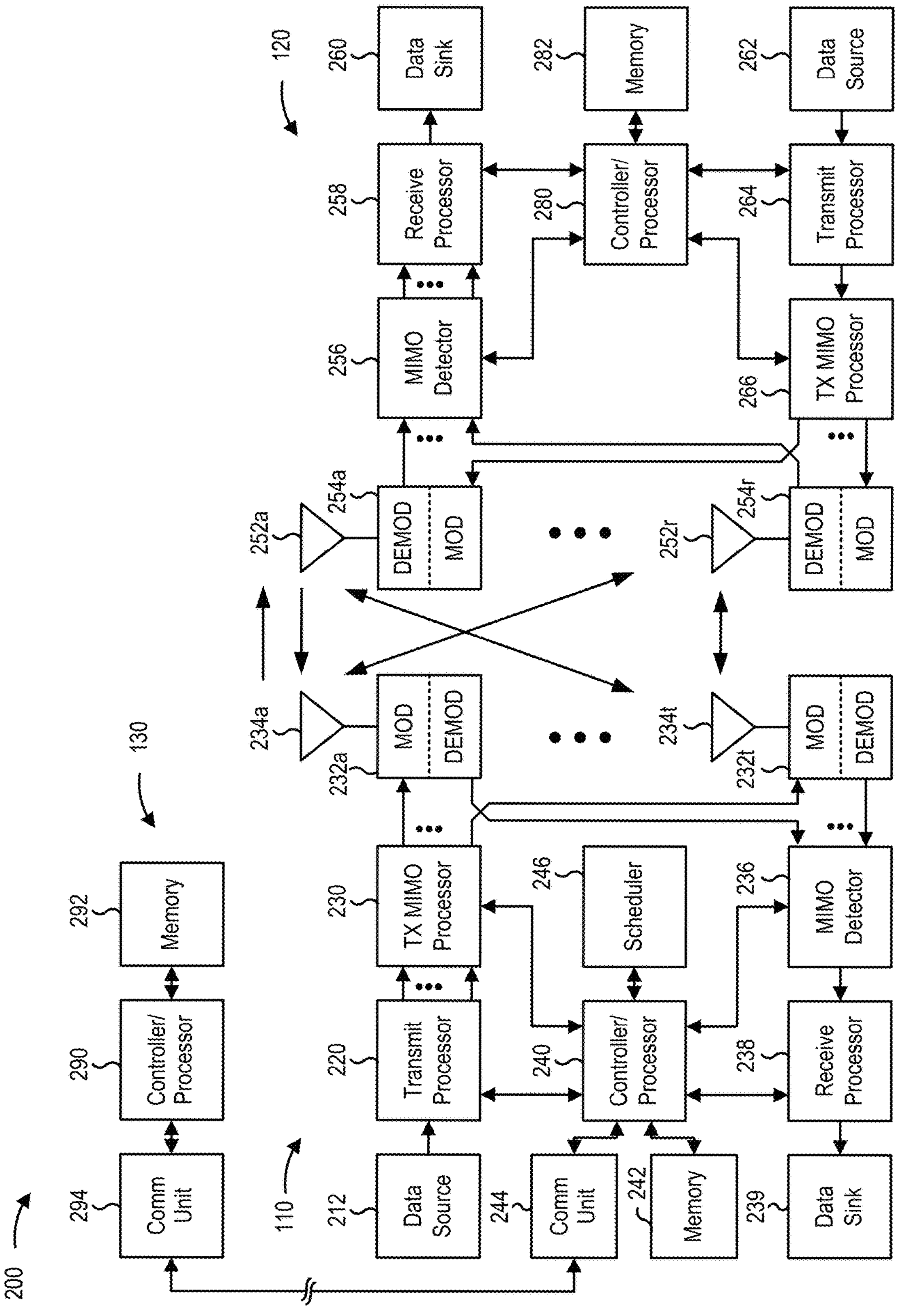
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general $T \geq 1$ and $R \geq 1$.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (for example, for orthogonal frequency division multiplexing (OFDM) and/or the like) to obtain an output sample stream. Each modulator 232 may further process (for example, convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (for example, for discrete Fourier transform spread OFDM (DFT-s-OFDM), CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with a change in a polarization communication state of an antenna array architecture of the UE in accordance with the UE changing from a first geometric configuration to a second geometric configuration, or vice versa, as described in more detail elsewhere. For example, the controller/processor 240 of the base station 110, the controller/processor 280 of the UE 120, and/or any other component(s) of FIG. 2 may perform or direct operations of, for example, the processes of FIGS. 8 and 10 and/or other processes as described. Memories 242 and 282 may store data and program codes for the base station 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (for example, a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (for example, the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (for example, central unit-user plane (CU-UP)), control plane functionality (for example, central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO framework 305 may be configured to support RAN deployment and provisioning of non-virtualized and virtualized network elements. For non-virtualized network elements, the SMO framework 305 may be configured to support the deployment of dedicated physical resources for RAN coverage requirements, which may be managed via an operations and maintenance interface (such as an O1 interface). For virtualized network elements, the SMO framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO framework 305 can communicate with a hardware aspect of a 4G RAN, such as an open eNB (O-eNB) 311, via an O1 interface. Additionally, in some implementations, the SMO framework 305 can communicate directly with one or more RUs 340 via an O1 interface. The SMO framework 305 also may include a non-RT RIC 315 configured to support functionality of the SMO framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO framework 305 (such as reconfiguration via O1) or via creation of RAN management policies (such as A1 policies).

An antenna module may include an array of antenna elements controlled by a single radio frequency integrated chip (RFIC). Conventional dual-polarized antenna modules specified for millimeter wave frequencies are typically fixed and do not change form once deployed in a phone. The millimeter wave frequencies may include FR2 (24.25-52.6 GHz) and FR3 (7.125-24.25 GHz) frequency ranges. By using two orthogonal polarization layers, the dual-polarized antenna module may double a data communication rate within a same area or aperture in comparison to a uni-polarized antenna module. If dual-polarized performance is lost or deteriorated, the data communication rate is effectively halved. A UE with an adjustable form factor (for example, foldable or flippable) may dynamically change from one geometric configuration to another geometric configuration. Additionally, depending on a hinge design, the adjustable form factor UE may have intermediate form factors, creating variability in the form factor. The thickness of a conventional UE without an adjustable form factor may be limited to 4 or 5 mm. For UEs with an adjustable form factor, the thickness may be thinner (for example, approximately 3 mm).

In most adjustable form factor UEs, the allowed or expected module thickness ranges between 2.9 to 3.2 mm, depending on a manufacturer. One reason for this limitation is that while the overall phone thickness may be approximately 7 mm, the sides are often constructed of metal for sturdiness, necessitating a window to fit the antenna module. If the module is larger than the window, radiation is obstructed, such that the module is specified to be smaller than a width of the adjustable form factor UE. As UE thickness decreases to approximately 5 mm, a window of approximately 3 mm becomes practical from a design perspective. Additionally, many manufacturers aim to design antenna modules that are compatible with both non-foldable and foldable phones, which further restricts the specified thickness for an antenna module to ensure broad applicability and integration across different UE types.

In most cases, to satisfy radiation performance specifications, each unit cell, or radiating element, of an antenna, may be at least 0.5 times a wavelength (λ) in both width and length, forming a dimension of 0.5λ×0.5λ. Specifying that a unit cell should have a 0.5λ×0.5λ dimension may ensure that a radiating element is large enough to radiate or capture electromagnetic waves at a desired frequency. As an example, at 30 GHz, the wavelength (λ) is approximately 10 mm, therefore, the dimensions of each unit cell may be 5 mm×5 mm. At lower frequencies, such as 13 GHz, the dimensions of each unit cell may be approximately 11.5 mm×11.5 mm. Such dimensions may be impractical for an adjustable form factor UE having a thickness limited to 3 mm as the width of each unit cell would be greater than the thickness (for example, width) of the adjustable form factor UE. As a result, conventional adjustable form factor UEs may be limited to using a uni-polarized antenna module that only uses one polarization, thereby limiting the communication data rates.

In some examples, an adjustable form factor UE may overcome the discussed limitations associated with dual-polarized antenna modules through the use of an antenna array architecture that may form a split antenna array associated with the uni-polarization communication state when the UE is configured according to a first geometric configuration and a single antenna array associated with the dual-polarization communication state when the UE is configured according to a second geometric configuration. The split antenna array may also be referred to as a split antenna array architecture (hereinafter used interchangeably). The single antenna array may also be referred to as a single antenna array architecture (hereinafter used interchangeably).

Figure 4:
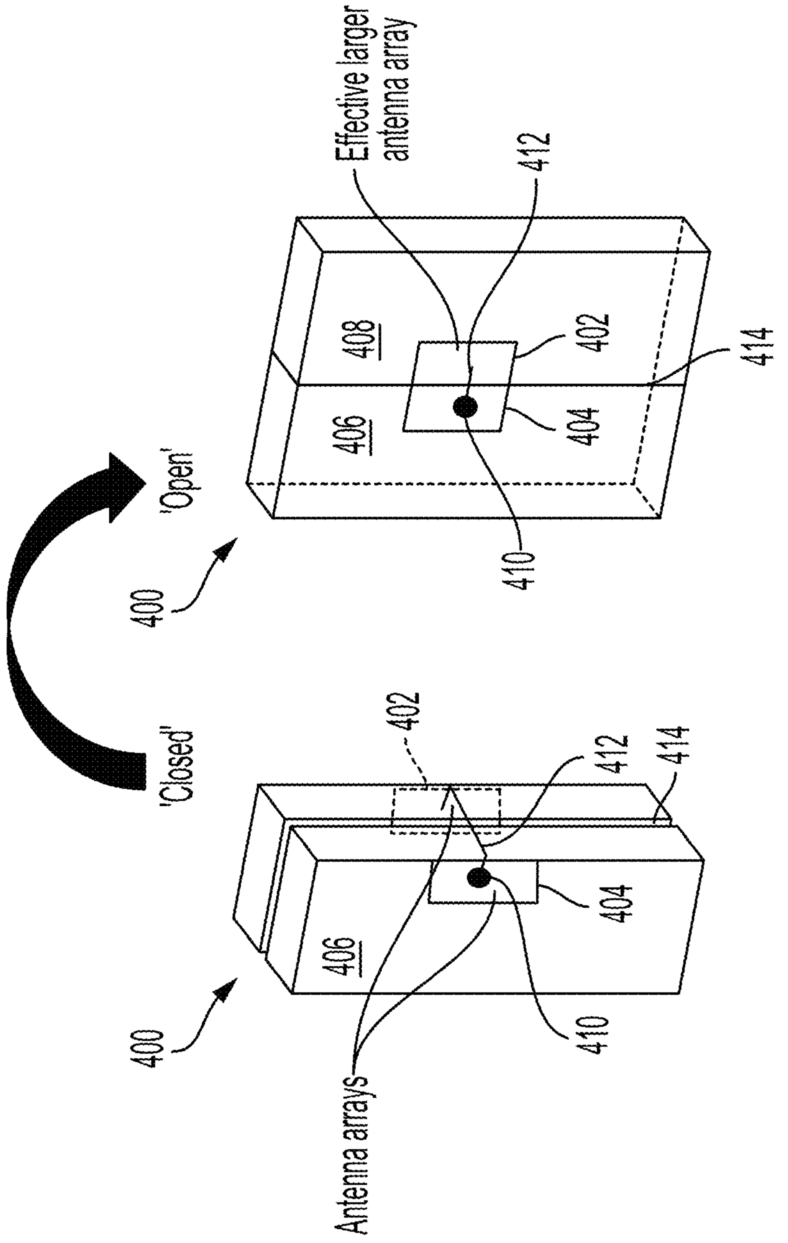
FIG. 4 is a block diagram illustrating an example of an adjustable form factor UE, in accordance with various aspects of the present disclosure.

FIG. 4 is a block diagram illustrating an example of an adjustable form factor UE 400, in accordance with various aspects of the present disclosure. The adjustable form factor UE 400 may be an example of a UE 120 described with reference to FIGS. 1, 2, and 3. In the example of FIG. 4, the UE 400 includes two antenna arrays 402 and 404. Each antenna array may also be referred to as an antenna module. Additionally, the UE 400 has two states: closed (for example, first geometric configuration) and open (for example, second geometric configuration). In the closed state, the antenna arrays 402 and 404 are positioned on opposite sides 406 and 408 of the UE 400, with an RFIC 410 located on one side 406 of the two sides 406 and 408. In the example of FIG. 4, a first side 406 may be an example of a front of the UE 400 and a second side 408 may be an example of a back of the UE 400, or vice versa. An RF connector 412 extends from the RFIC 410 to an antenna array 404 on an opposite side 408, allowing the signal to be shared between the two antenna arrays 402 and 404. In some examples, when the UE 400 is in the closed position, there may be some feedline loss when the signal travels from one antenna array 402 to another antenna array 404. This feedline loss may be reduced or non-existent when the UE 400 is in the open position because the two antenna arrays 402 and 404 may be adjacent to each other. In some examples, the location of the RFIC 410 may also correspond with a bump (not shown in the example of FIG. 4). The bump refers to a slight protrusion or raised area on the UE 400. A hinge mechanism 414 may be provided between the two sides 406 and 408 of the UE 400.

In the example of FIG. 4, in the open state, the hinge mechanism 414 retracts the RF connector 412, allowing the two antenna arrays 402 and 404 to effectively combine into a single, larger array (for example, a single antenna array architecture). This transformation improves antenna capabilities of the UE 400. In the closed configuration, the physical separation of the antenna arrays 402 and 404 restricts the UE 400 to a uni-polarization communication state, where each antenna array 402 and 404 independently processes a single polarization direction. The uni-polarization communication state results in a limited data rate. However, when the UE 400 is unfolded into the open state, the combined larger array enables the dual-polarization communication state. The dual-polarization communication state allows the UE 400 to simultaneously transmit or receive signals in two perpendicular polarization directions, effectively doubling the data transmission rate. This capability is particularly beneficial in high-frequency communication systems, such as those used in 5G networks, sixth generation (6G) networks, and future networks.

Figure 5:
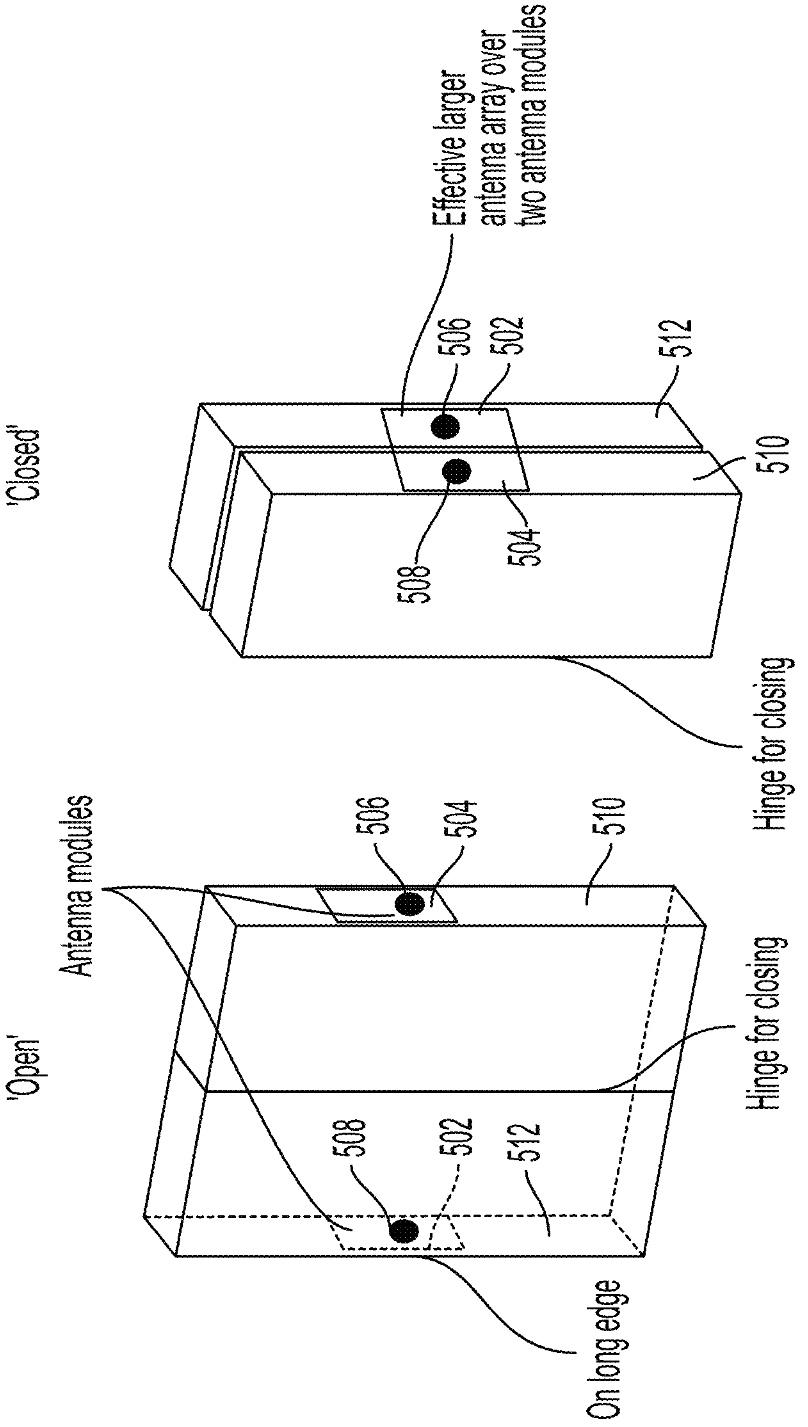
FIG. 5 is a block diagram illustrating an example of an adjustable form factor UE, in accordance with various aspects of the present disclosure.

FIG. 5 is a block diagram illustrating an example of an adjustable form factor UE 500, in accordance with various aspects of the present disclosure. The adjustable form factor UE 500 may be an example of a UE 120 described with reference to FIGS. 1, 2, and 3. In the example of FIG. 5, the UE 500 includes two antenna arrays 502 and 504. Each antenna array may also be referred to as an antenna module. Additionally, the UE 500 has two states: open (for example, first geometric configuration) and closed (for example, second geometric configuration). In the open state, the two antenna modules 502 and 504, each controlled by a separate RFIC 506 and 508, are positioned on the opposite edges 510 and 512 of the UE 500. Due to the thin design of the UE 500, in the open state, the split antenna array architecture corresponding to the antenna modules 502 and 504 can only operate in accordance with the uni-polarization communication state. The data rate achievable in the open state is approximately $\log_2(1+X_1)+\log_2(1+X_2)$, where $X_1$ and $X_2$ represent the signal strengths or signal-to-noise ratios (SNRs) observed by each antenna module 502 and 504, with $X_1$ being greater than $X_2$. In the closed state, the two antenna modules 502 and 504 combine into a single, larger effective, antenna array. This single antenna array architecture includes the two antenna modules 502 and 504, each controlled by a respective RFIC 506 and 508. The increased thickness of this effective array (for example, single antenna array architecture) enables the UE 500 to communication in accordance with the dual-polarization communication state. In the dual-polarization communication state, the achievable data communication rate is approximately $2\log_2(1+X_1)$, where $X_1$ is the SNR experienced by the larger, single antenna array architecture. The "2" factor represents the dual-polarization communication state of the single antenna array architecture, which effectively doubles the data communication rate in comparison to the uni-polarization communication state associated with the open state.

Aspects of the present disclosure are not limited to the form factors of the UEs 400 and 500 described with reference to FIGS. 4 and 5, respectively. Other types of form factors are contemplated, such as a rollable form factor or any other form factor in which a UE can transition from one geometric configuration to another. Additionally, a transition state from one geometric configuration to another is another type of geometric configuration.

As discussed, the configuration of the antenna array architecture changes when the UE changes a geometric configuration. In some examples, the single antenna array architecture associated with the dual-polarization communication may support advanced beamforming techniques to improve signal quality and data throughput. However, the RFIC in the UE may not have pre-configured beamforming data for the single antenna array architecture. The RFIC may store beamforming weights for specific, simpler configurations, such as the split antenna array architecture associated with the uni-polarization communication state. When the UE changes to a geometric configuration associated with the single antenna array architecture, the stored beamforming weights may not be optimal.

In some examples, based on feedback from the UE, the network node may be informed about the dual-polarization communication state associated with the single antenna array architecture due to the device being unfolded. The network node then sends one or more reference signals to the UE. The UE may determine beam weights for hybrid beamforming in accordance with one or more channel characteristics associated with measurements of the one or more reference signals. The measurements may include measurements of characteristics of the channel, such as path loss, phase shift, and interference, from each antenna element of the receiver. The beam weights are examples of complex coefficients applied to the signal at each antenna element of the single antenna array architecture. The purpose of these weights is to adjust the phase and amplitude of the signal from each antenna so that the signals combine constructively at the receiver, enhancing the overall signal strength and quality. The UE then configures a beamforming pattern for the dual-polarization communication state in accordance with the hybrid beamforming beam weights.

Figure 6:
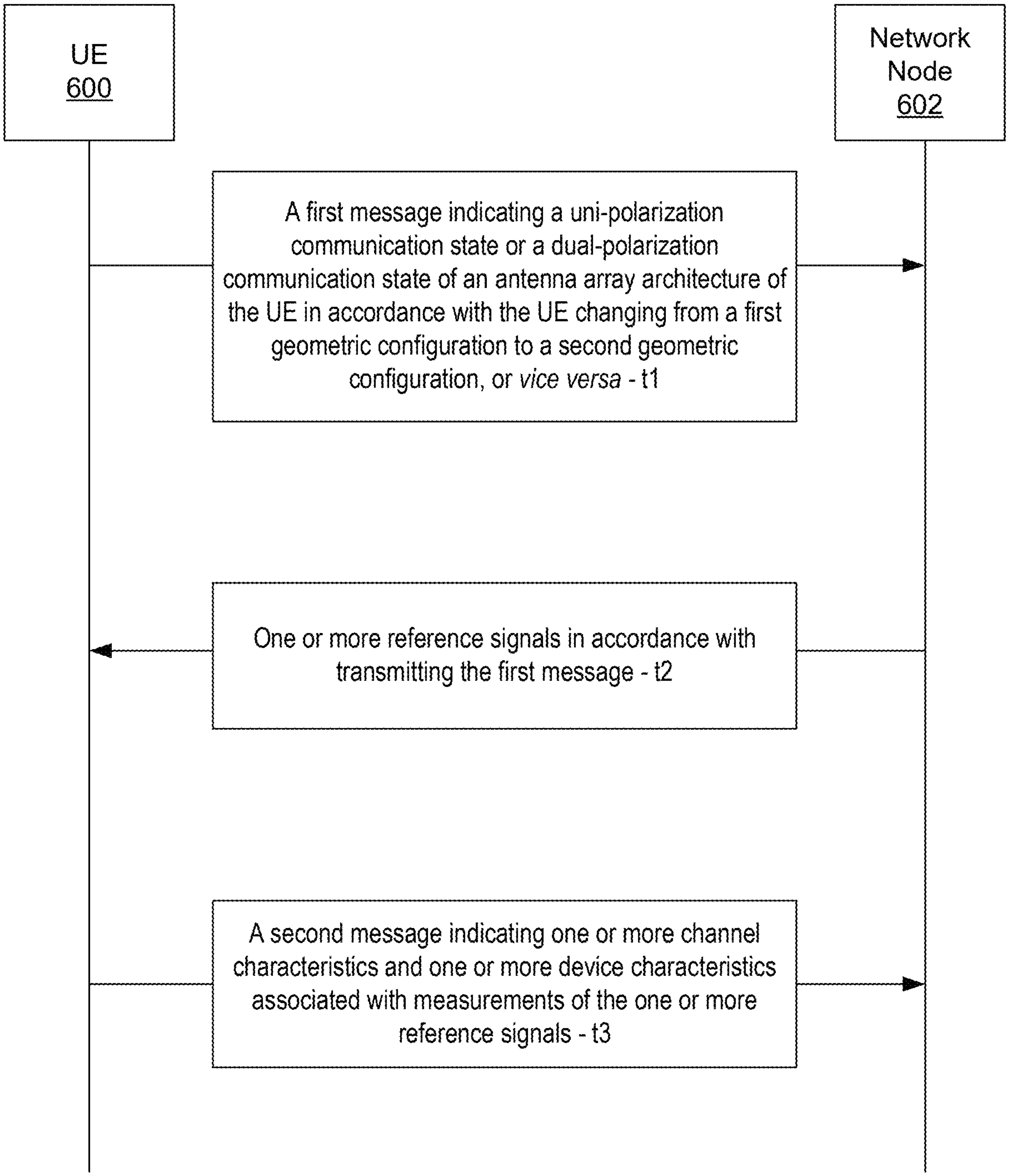
FIG. 6 is a timing diagram illustrating an example of a UE indicating, to a network node, a change in a polarization communication state, in accordance with various aspects of the present disclosure.

As discussed, a UE may indicate a change in a polarization communication state to a network node. FIG. 6 is a timing diagram illustrating an example of a UE 600 indicating, to a network node 602, a change in a polarization communication state, in accordance with various aspects of the present disclosure. In the example of FIG. 6, the UE 600 may be an example of a UE 120 described with reference to FIGS. 1, 2, and 3, a UE 400 described with reference to FIG. 4, or a UE 500 described with reference to FIG. 5. The network node 602 may be an example of a base station 110 described with reference to FIGS. 1 and 2, or a DU 330, an RU 340, or a CU 310 described with reference to FIG. 3.

As shown in the example of FIG. 6, at time t1, the UE 600 transmits, to the network node 602, a first message indicating a uni-polarization communication state or a dual-polarization communication state of an antenna array architecture of the UE 600 in accordance with the UE 600 changing from a first geometric configuration to a second geometric configuration, or vice versa. The antenna array architecture may form a split antenna array architecture associated with the uni-polarization communication state when the UE is configured according to the first geometric configuration, and a single antenna array architecture associated with the dual-polarization communication state when the UE is configured according to the second geometric configuration. The antenna array architecture may include two distinct antenna modules. The first message further indicates a respective PMI and respective RI corresponding to the uni-polarization communication state or the dual-polarization communications. The uni-polarization communication state may be associated with a first rank and a first PMI. Additionally, the dual-polarization communication state may be associated with a second rank and a second PMI, the second rank being higher than the first rank. The first and second PMU may be selected from a codebook of applicable precoders. Each of the first and second PMI may be selected in accordance with channel conditions or other factors associated with the respective communication state.

At time t2, the UE 600 receives, from the network node 602, one or more reference signals (RSs) in accordance with transmitting the first message. The one or more RSs may include one or more first RSs associated with the uni-polarization communication state, or one or more second RSs associated with the dual-polarization communication state. The one or more first RSs may be associated with the first rank and the first PMI, and the one or more second RSs may be associated with the second rank and the second PMI. In some examples, the UE 600 determines beam weights for hybrid beamforming in accordance with the one or more channel characteristics associated with the measurements of the one or more RSs corresponding to the UE changing from the first geometric configuration to the second geometric configuration. Additionally, the UE 600 may configure a beamforming pattern for the dual-polarization communication state in accordance with the hybrid beamforming beam weights. At time t3, the UE 600 transmits, to the network node 602, a second message indicating one or more channel characteristics and one or more device characteristics associated with measurements of the one or more RSs. The one or more device characteristics may indicate one or more of a device geometry, placement of an antenna array, or a degree of feedline loss over a radio frequency connector between different antenna parts of the split antenna array architecture.

Figure 7:
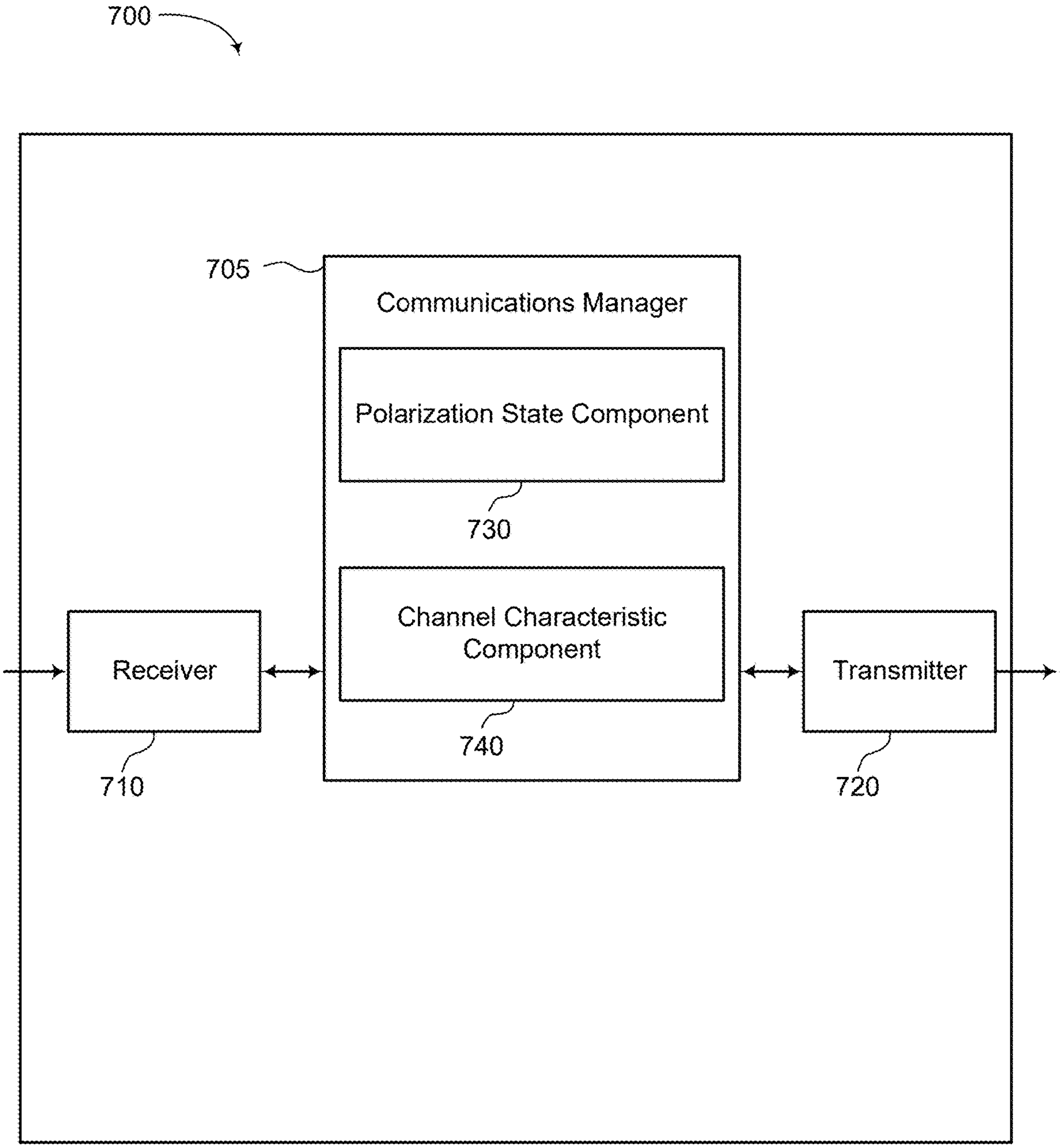
FIG. 7 is a block diagram illustrating an example wireless communication device that supports a uni-polarization communication state or a dual-polarization communication state in accordance with a geometric configuration, in accordance with various aspects of the present disclosure.

FIG. 7 is a block diagram illustrating an example wireless communication device 700 that supports a uni-polarization communication state or a dual-polarization communication state in accordance with a geometric configuration, in accordance with various aspects of the present disclosure. The device 700 may be an example of aspects of a UE 120 described with reference to FIGS. 1, 2, and 3, a UE 400 described with reference to FIG. 4, a UE 500 described with reference to FIG. 5, or a UE 600 described with reference to FIG. 6. The wireless communication device 700 may include a receiver 710, a communications manager 705, a transmitter 720, a polarization state component 730, and a channel characteristic component 740, which may be in communication with one another (for example, via one or more buses). In some examples, the wireless communication device 700 is configured to perform operations, including operations of the process 800 described below with reference to FIG. 8.

In some examples, the wireless communication device 700 can include a chip, chipset, package, or device that includes at least one processor and at least one modem (for example, a 5G modem or other cellular modem). In some examples, the communications manager 705, or its subcomponents, may be separate and distinct components. In some examples, at least some components of the communications manager 705 are implemented at least in part as software stored in a memory. For example, portions of one or more of the components of the communications manager 705 can be implemented as non-transitory code executable by the processor to perform the functions or operations of the respective component.

The receiver 710 may receive one or more of reference signals (for example, periodically configured CSI-RSs, aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a physical downlink control channel (PDCCH) or physical uplink control channel (PUCCH)) and data channels (for example, a physical downlink shared channel (PDSCH) or physical sidelink shared channel (PSSCH)). The other wireless communication devices may include, but are not limited to, a base station 110 described with reference to FIGS. 1 and 2, a DU 330, an RU 340, or a CU 310 described with reference to FIG. 3, or a network node 602 described with reference to FIG. 6.

The received information may be passed on to other components of the device 700. The receiver 710 may be an example of aspects of the receive processor 258 described with reference to FIG. 2. The receiver 710 may include a set of radio frequency (RF) chains that are coupled with or otherwise utilize a set of antennas (for example, the set of antennas may be an example of aspects of the antennas 252 described with reference to FIG. 2).

The transmitter 720 may transmit signals generated by the communications manager 705 or other components of the wireless communication device 700. In some examples, the transmitter 720 may be collocated with the receiver 710 in a transceiver. The transmitter 720 may be an example of aspects of the transmit processor 274 described with reference to FIG. 2. The transmitter 720 may be coupled with or otherwise utilize a set of antennas (for example, the set of antennas may be an example of aspects of the antennas 252 described with reference to FIG. 2), which may be antenna elements shared with the receiver 710. In some examples, the transmitter 720 is configured to transmit control information in a PUCCH or physical sidelink control channel (PSCCH) and data in a physical uplink shared channel (PUSCH) or PSSCH.

The communications manager 705 may be an example of aspects of the controller/processor 280 described with reference to FIG. 2. The communications manager 705 may include the polarization state component 730, and the channel characteristic component 740. In some examples, working in conjunction with the transmitter 720, the polarization state component 730 transmits, to a network node, a first message indicating a uni-polarization communication state or a dual-polarization communication state of an antenna array architecture of the UE in accordance with the UE changing from a first geometric configuration to a second geometric configuration, or vice versa. The antenna array architecture may form a split antenna array associated with the uni-polarization communication state when the UE is configured according to the first geometric configuration; and a single antenna array associated with the dual-polarization communication state when the UE is configured according to the second geometric configuration. Additionally, working in conjunction with one or both of the polarization state component 730 or the receiver 710, the channel characteristic component 740 receives, from the network node, one or more RSs in accordance with transmitting the first message. Furthermore, working in conjunction with one or both of the polarization state component 730 or the transmitter 720, the channel characteristic component 740 transmits, to the network node, a second message indicating one or more channel characteristics and one or more device characteristics associated with measurements of the one or more RSs.

Figure 8:
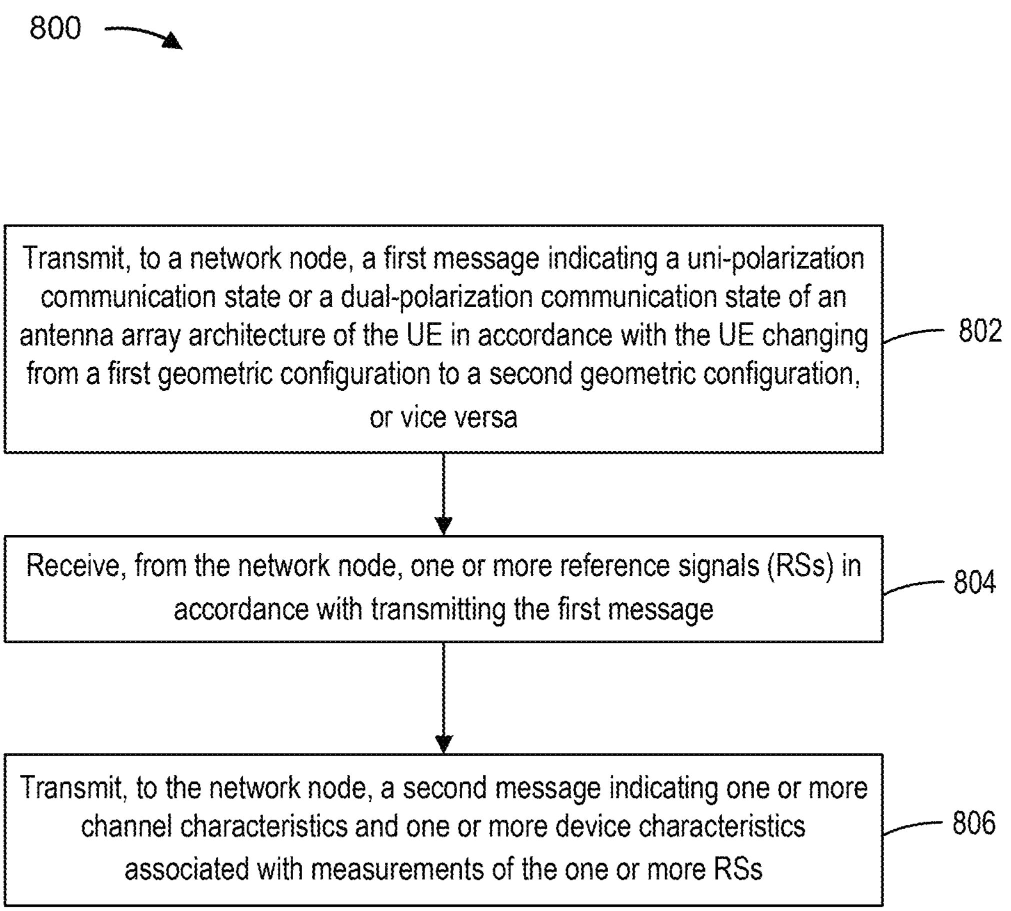
FIG. 8 is a flow diagram illustrating an example of a process for indicating a polarization communication state, in accordance with various aspects of the present disclosure.

FIG. 8 is a flow diagram illustrating an example of a process 800 for indicating a polarization communication state, in accordance with various aspects of the present disclosure. The process 800 may be performed by a UE, such as the UE 120 described with reference to FIGS. 1, 2, and 3, a UE 400 described with reference to FIG. 4, a UE 500 described with reference to FIG. 5, or a UE 600 described with reference to FIG. 6. The process 800 begins at block 802 by transmitting, to a network node, a first message indicating a uni-polarization communication state or a dual-polarization communication state of an antenna array architecture of the UE in accordance with the UE changing from a first geometric configuration to a second geometric configuration, or vice versa. The antenna array architecture may form a split antenna array associated with the uni-polarization communication state when the UE is configured according to the first geometric configuration; and a single antenna array associated with the dual-polarization communication state when the UE is configured according to the second geometric configuration. At block 804, the process 800 receives, from the network node, one or more RSs in accordance with transmitting the first message. At block 806, the process 800 transmits, to the network node, a second message indicating one or more channel characteristics and one or more device characteristics associated with measurements of the one or more RSs.

Figure 9:
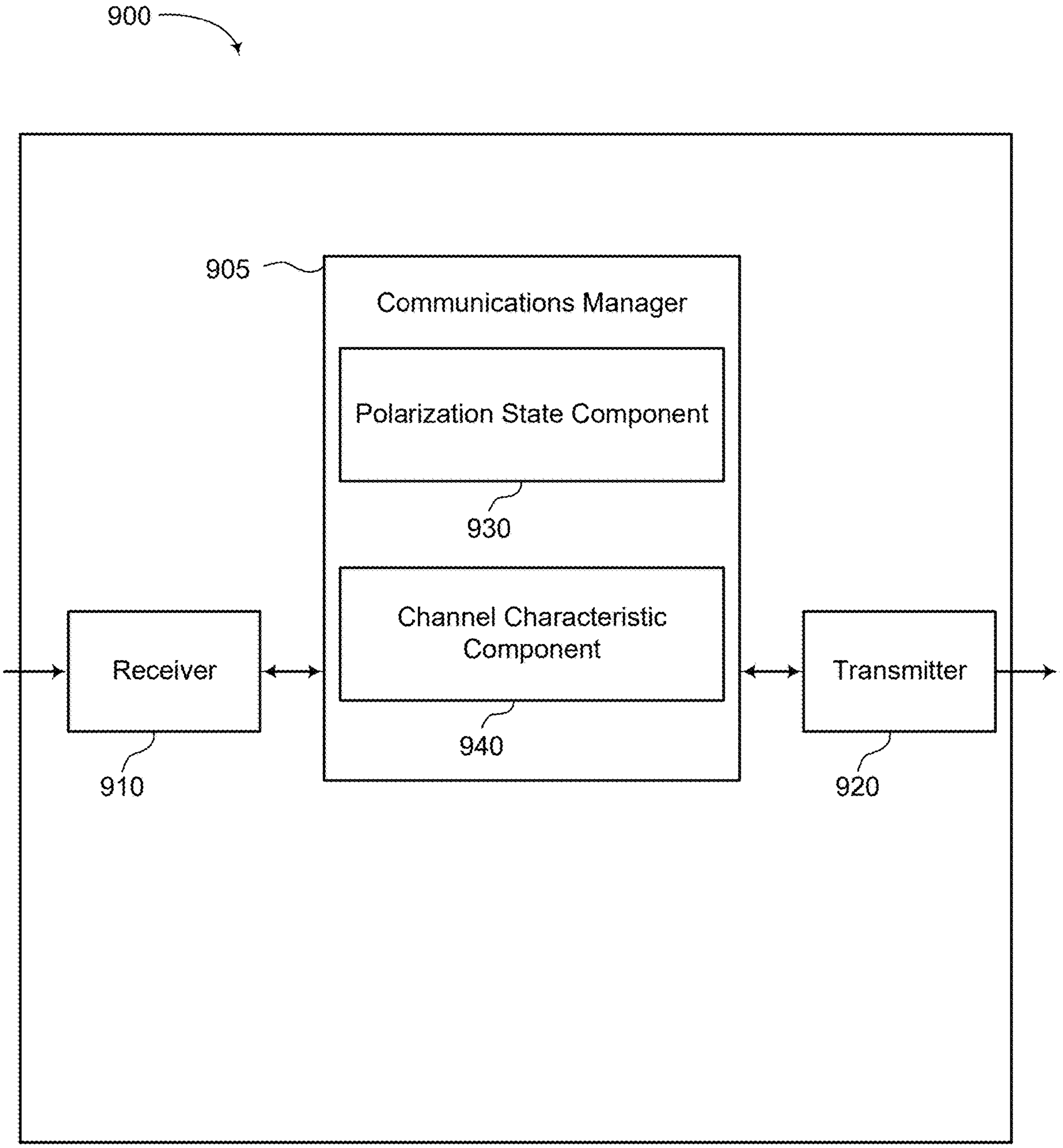
FIG. 9 is a block diagram illustrating an example wireless communication device that supports receiving an indication of a polarization communication state, in accordance with various aspects of the present disclosure.

FIG. 9 is a block diagram illustrating an example wireless communication device 900 that supports receiving an indication of a polarization communication state, in accordance with various aspects of the present disclosure. The device 900 may be an example of aspects of a base station 110 described with reference to FIGS. 1 and 2, a DU 330, an RU 340, or a CU 310 described with reference to FIG. 3, or a network node 602 described with reference to FIG. 6. The wireless communication device 900 may include a receiver 910, a communications manager 905, a transmitter 920, a polarization state component 930, and a channel characteristic component 940, which may be in communication with one another (for example, via one or more buses). In some examples, the wireless communication device 900 is configured to perform operations, including operations of the process 1000 described below with reference to FIG. 10.

In some examples, the wireless communication device 900 can include a chip, chipset, package, or device that includes at least one processor and at least one modem (for example, a 5G modem or other cellular modem). In some examples, the communications manager 905, or its sub-components, may be separate and distinct components. In some examples, at least some components of the communications manager 905 are implemented at least in part as software stored in a memory. For example, portions of one or more of the components of the communications manager 905 can be implemented as non-transitory code executable by the processor to perform the functions or operations of the respective component.

The receiver 910 may receive one or more of reference signals (for example, periodically configured CSI-RSs, aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, PUCCH or PSCCH) and data channels (for example, a PSSCH or a PUSCH). The other wireless communication devices may include, but are not limited to, the UE 120 described with reference to FIGS. 1, 2, and 3, a UE 400 described with reference to FIG. 4, a UE 500 described with reference to FIG. 5, or a UE 600 described with reference to FIG. 6.

The received information may be passed on to other components of the device 900. The receiver 910 may be an example of aspects of the receive processor 258 described with reference to FIG. 2. The receiver 910 may include a set of radio frequency (RF) chains that are coupled with or otherwise utilize a set of antennas (for example, the set of antennas may be an example of aspects of the antennas 234 described with reference to FIG. 2).

The transmitter 920 may transmit signals generated by the communications manager 905 or other components of the wireless communication device 900. In some examples, the transmitter 920 may be collocated with the receiver 910 in a transceiver. The transmitter 920 may be an example of aspects of the transmit processor 220 described with reference to FIG. 2. The transmitter 920 may be coupled with or otherwise utilize a set of antennas (for example, the set of antennas may be an example of aspects of the antennas 234 described with reference to FIG. 2), which may be antenna elements shared with the receiver 910. In some examples, the transmitter 920 is configured to transmit control information in a PSCCH or PDCCH and data in a PSSCH or PDSCH.

The communications manager 905 may be an example of aspects of the controller/processor 240 described with reference to FIG. 2. The communications manager 905 may include the polarization state component 930, and the channel characteristic component 940. In some examples, working in conjunction with the receiver 910, the polarization state component 930 receives, from a UE, a first message indicating a uni-polarization communication state or a dual-polarization communication state of an antenna array architecture of the UE in accordance with the UE changing from a first geometric configuration to a second geometric configuration, or vice versa. The antenna array architecture may form a split antenna array associated with the uni-polarization communication state when the UE is configured according to the first geometric configuration; and a single antenna array associated with the dual-polarization communication state when the UE is configured according to the second geometric configuration. Additionally, working in conjunction with one or both of the transmitter 920 or the polarization state component 930, the channel characteristic component 940 transmits one or more RSs in accordance with transmitting the first message. Furthermore, working in conjunction with one or both of the receiver 910 or the polarization state component 930, the channel characteristic component 940 receives, from the UE, a second message indicating one or more channel characteristics and one or more device characteristics associated with measurements of the one or more RSs.

Figure 10:
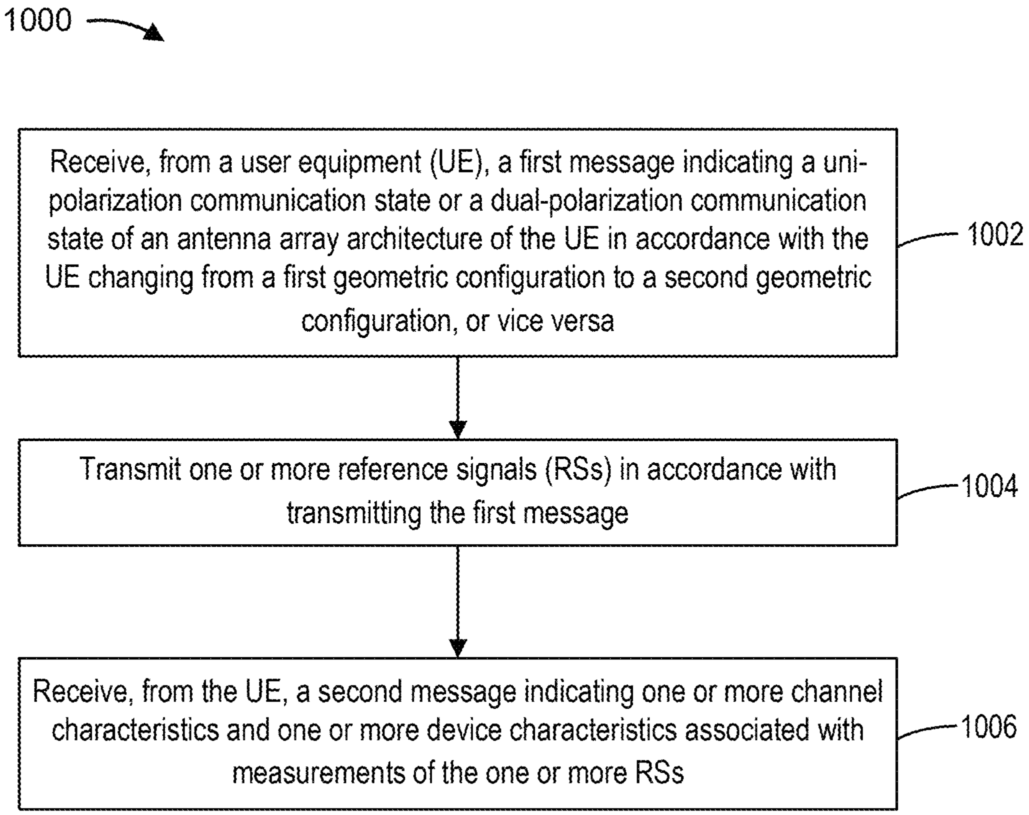
FIG. 10 is a flow diagram illustrating an example of a process for receiving an indication of a polarization communication state, in accordance with various aspects of the present disclosure.

FIG. 10 is a flow diagram illustrating an example of a process 1000 for receiving an indication of a polarization communication state, in accordance with various aspects of the present disclosure. The process 1000 may be performed by a network node, such as a base station 110 described with reference to FIGS. 1 and 2, a DU 330, an RU 340, or a CU 310 described with reference to FIG. 3, or a network node 602 described with reference to FIG. 6. The process 1000 begins at block 1002 by receiving, from a UE, a first message indicating a uni-polarization communication state or a dual-polarization communication state of an antenna array architecture of the UE in accordance with the UE changing from a first geometric configuration to a second geometric configuration, or vice versa. The antenna array architecture may form a split antenna array associated with the uni-polarization communication state when the UE is configured according to the first geometric configuration; and a single antenna array associated with the dual-polarization communication state when the UE is configured according to the second geometric configuration. At block 1004, the process 1000 transmits one or more RSs in accordance with transmitting the first message. At block 1006, the process 1000 receives, from the UE, a second message indicating one or more channel characteristics and one or more device characteristics associated with measurements of the one or more RSs.

Implementation examples are described in the following numbered clauses:

Clause 1. A method for wireless communication at a UE, comprising: transmitting, to a network node, a first message indicating a uni-polarization communication state or a dual-polarization communication state of an antenna array architecture of the UE in accordance with the UE changing from a first geometric configuration to a second geometric configuration, or vice versa, the antenna array architecture forming: a split antenna array associated with the uni-polarization communication state when the UE is configured according to the first geometric configuration; and a single antenna array associated with the dual-polarization communication state when the UE is configured according to the second geometric configuration; receiving, from the network node, one or more RSs in accordance with transmitting the first message; and transmitting, to the network node, a second message indicating one or more channel characteristics and one or more device characteristics associated with measurements of the one or more RSs.

Clause 2. The method of Clause 1, wherein the first message further indicates a respective PMI and respective RI corresponding to the uni-polarization communication state or the dual-polarization communication state in accordance with the UE changing from the first geometric configuration to the second geometric configuration, or vice versa.

Clause 3. The method of Clause 2, wherein: the uni-polarization communication state is associated with a first rank and a first PMI; the dual-polarization communication state is associated with a second rank and a second PMI; the second rank is higher than the first rank; and the first PMI is different than the second PMI.

Clause 4. The method of any one of Clauses 1-3, wherein the one or more device characteristics include one or more of a UE geometry, placement of the antenna array architecture within the UE geometry, or an amount of feedline loss over a RF connector between different antenna modules associated with the split antenna array.

Clause 5. The method of Clause 4, further comprising: determining beam weights for hybrid beamforming in accordance with the one or more channel characteristics associated with the measurements of the one or more RSs corresponding to the UE changing from the first geometric configuration to the second geometric configuration; and configuring a beamforming pattern for the dual-polarization communication state in accordance with the hybrid beamforming beam weights.

Clause 6. The method of any one of Clauses 1-5, wherein: the antenna array architecture includes a first antenna module and a second antenna module; and the first antenna module includes a first array of antenna elements controlled by a first RFIC.

Clause 7. The method of Clause 6, wherein a RF connector connects the first antenna module to a second antenna module that includes a second array of antenna elements.

Clause 8. The method of Clause 6, wherein the second antenna module includes a second array of antenna elements controlled by a second RFIC.

Clause 9. The method of Clause 6, wherein: the first antenna module is adjacent to the second antenna module in the single antenna array; and the first antenna module is separated from the second antenna module in the split array.

Clause 10. A method for wireless communication at a network node, comprising: receiving, from a UE, a first message indicating a uni-polarization communication state or a dual-polarization communication state of an antenna array architecture of the UE in accordance with the UE changing from a first geometric configuration to a second geometric configuration, or vice versa, the antenna array architecture forming: a split antenna array associated with the uni-polarization communication state when the UE is configured according to the first geometric configuration; and a single antenna array associated with the dual-polarization communication state when the UE is configured according to the second geometric configuration; transmitting one or more RSs in accordance with transmitting the first message; and receiving, from the UE, a second message indicating one or more channel characteristics and one or more device characteristics associated with measurements of the one or more RSs.

Clause 11. The method of Clause 10, wherein the first message further indicates a respective PMI and respective RI corresponding to the uni-polarization communication state or the dual-polarization communication state in accordance with the UE changing from the first geometric configuration to the second geometric configuration, or vice versa.

Clause 12. The method of Clause 11, wherein: the uni-polarization communication state is associated with a first rank and a first PMI; the dual-polarization communication state is associated with a second rank and a second PMI; the second rank is higher than the first rank; and the first PMI is different than the second PMI.

Clause 13. The method of any one of clauses 10-12, wherein the one or more device characteristics include one or more of a UE geometry, placement of the antenna array architecture within the UE geometry, or an amount of feedline loss over a RF connector between different antenna modules associated with the split antenna array.

Clause 14. An apparatus comprising a processor, memory coupled with the processor, and instructions stored in the memory and operable, when executed by the processor to cause the apparatus to perform any one of Clauses 1-9.

Clause 15. An apparatus comprising at least one means for performing any one of Clauses 1-9.

Clause 16. A computer program comprising code for causing an apparatus to perform any one of Clauses 1-8.

Clause 17. An apparatus comprising a processor, memory coupled with the processor, and instructions stored in the memory and operable, when executed by the processor to cause the apparatus to perform any one of Clauses 10-13.

Clause 18. An apparatus comprising at least one means for performing any one of Clauses 10-13.

Clause 19. A computer program comprising code for causing an apparatus to perform any one of Clauses 10-13.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication at a user equipment (UE), comprising:

transmitting, to a network node, a first message indicating a uni-polarization communication state or a dual-polarization communication state of an antenna array architecture of the UE in accordance with the UE changing from a first geometric configuration to a second geometric configuration, or vice versa, the antenna array architecture forming:

a split antenna array associated with the uni-polarization communication state when the UE is configured according to the first geometric configuration; and a single antenna array associated with the dual-polarization communication state when the UE is configured according to the second geometric configuration;

receiving, from the network node, one or more reference signals (RSs) in accordance with transmitting the first message; and transmitting, to the network node, a second message indicating one or more channel characteristics and one or more device characteristics associated with measurements of the one or more RSs.

2. The method of claim 1, wherein the first message further indicates a respective precoding matrix indicator (PMI) and respective rank information (RI) corresponding to the uni-polarization communication state or the dual-polarization communication state in accordance with the UE changing from the first geometric configuration to the second geometric configuration, or vice versa.

3. The method of claim 2, wherein:

the uni-polarization communication state is associated with a first rank and a first PMI;

the dual-polarization communication state is associated with a second rank and a second PMI;

the second rank is higher than the first rank; and the first PMI is different than the second PMI.

4. The method of claim 1, wherein the one or more device characteristics include one or more of a UE geometry, placement of the antenna array architecture within the UE geometry, or an amount of feedline loss over a radio frequency (RF) connector between different antenna modules associated with the split antenna array.

5. The method of claim 4, further comprising:

determining beam weights for hybrid beamforming in accordance with the one or more channel characteristics associated with the measurements of the one or more RSs corresponding to the UE changing from the first geometric configuration to the second geometric configuration; and configuring a beamforming pattern for the dual-polarization communication state in accordance with the hybrid beamforming beam weights.

6. The method of claim 1, wherein:

the antenna array architecture includes a first antenna module and a second antenna module; and the first antenna module includes a first array of antenna elements controlled by a first radio frequency integrated chip (RFIC).

7. The method of claim 6, wherein a radio frequency (RF) connector connects the first antenna module to a second antenna module that includes a second array of antenna elements.

8. The method of claim 6, wherein the second antenna module includes a second array of antenna elements controlled by a second RFIC.

9. The method of claim 6, wherein:

the first antenna module is adjacent to the second antenna module in the single antenna array; and the first antenna module is separated from the second antenna module in the split array.

10. A user equipment (UE), comprising:

one or more processors; and one or more memories coupled with the one or more processors and storing processor-executable code that, when executed by the one or more processors, is configured to cause the UE to:

transmit, to a network node, a first message indicating a uni-polarization communication state or a dual-polarization communication state of an antenna array architecture of the UE in accordance with the UE changing from a first geometric configuration to a second geometric configuration, or vice versa, the antenna array architecture forming:

a split antenna array associated with the uni-polarization communication state when the UE is configured according to the first geometric configuration; and a single antenna array associated with the dual-polarization communication state when the UE is configured according to the second geometric configuration;

receive, from the network node, one or more reference signals (RSs) in accordance with transmitting the first message; and transmit, to the network node, a second message indicating one or more channel characteristics and one or more device characteristics associated with measurements of the one or more RSs.

11. The UE of claim 10, wherein the first message further indicates a respective precoding matrix indicator (PMI) and respective rank information (RI) corresponding to the uni-polarization communication state or the dual-polarization communication state in accordance with the UE changing from the first geometric configuration to the second geometric configuration, or vice versa.

12. The UE of claim 11, wherein:

the uni-polarization communication state is associated with a first rank and a first PMI;

the dual-polarization communication state is associated with a second rank and a second PMI;

the second rank is higher than the first rank; and the first PMI is different than the second PMI.

13. The UE of claim 10, wherein the one or more device characteristics include one or more of a UE geometry, placement of the antenna array architecture within the UE geometry, or an amount of feedline loss over a radio frequency (RF) connector between different antenna modules associated with the split antenna array.

14. The UE of claim 13, wherein execution of the processor-executable code further causes the UE to:

determine beam weights for hybrid beamforming in accordance with the one or more channel characteristics associated with the measurements of the one or more RSs corresponding to the UE changing from the first geometric configuration to the second geometric configuration; and configure a beamforming pattern for the dual-polarization communication state in accordance with the hybrid beamforming beam weights.

15. The UE of claim 10, wherein:

the antenna array architecture includes a first antenna module and a second antenna module; and the first antenna module includes a first array of antenna elements controlled by a first radio frequency integrated chip (RFIC).

16. The UE of claim 15, wherein a radio frequency (RF) connector connects the first antenna module to a second antenna module that includes a second array of antenna elements.

17. The UE of claim 15, wherein the second antenna module includes a second array of antenna elements controlled by a second RFIC.

18. The UE of claim 15, wherein:

the first antenna module is adjacent to the second antenna module in the single antenna array; and the first antenna module is separated from the second antenna module in the split array.

19. A method for wireless communication at a network node, comprising:

receiving, from a user equipment (UE), a first message indicating a uni-polarization communication state or a dual-polarization communication state of an antenna array architecture of the UE in accordance with the UE changing from a first geometric configuration to a second geometric configuration, or vice versa, the antenna array architecture forming:

a split antenna array associated with the uni-polarization communication state when the UE is configured according to the first geometric configuration; and a single antenna array associated with the dual-polarization communication state when the UE is configured according to the second geometric configuration;

transmitting one or more reference signals (RSs) in accordance with transmitting the first message; and receiving, from the UE, a second message indicating one or more channel characteristics and one or more device characteristics associated with measurements of the one or more RSs.

20. The method of claim 19, wherein the first message further indicates a respective precoding matrix indicator (PMI) and respective rank information (RI) corresponding to the uni-polarization communication state or the dual-polarization communication state in accordance with the UE changing from the first geometric configuration to the second geometric configuration, or vice versa.

21. The method of claim 20, wherein:

the uni-polarization communication state is associated with a first rank and a first PMI;

the dual-polarization communication state is associated with a second rank and a second PMI;

the second rank is higher than the first rank; and the first PMI is different than the second PMI.

22. The method of claim 19, wherein the one or more device characteristics include one or more of a UE geometry, placement of the antenna array architecture within the UE geometry, or an amount of feedline loss over a radio frequency (RF) connector between different antenna modules associated with the split antenna array.

23. A network node, comprising:

one or more processors; and one or more memories coupled with the one or more processors and storing processor-executable code that, when executed by the one or more processors, is configured to cause the network node to:

receive, from a user equipment (UE), a first message indicating a uni-polarization communication state or a dual-polarization communication state of an antenna array architecture of the UE in accordance with the UE changing from a first geometric configuration to a second geometric configuration, or vice versa, the antenna array architecture forming:

a split antenna array associated with the uni-polarization communication state when the UE is configured according to the first geometric configuration; and a single antenna array associated with the dual-polarization communication state when the UE is configured according to the second geometric configuration;

transmit one or more reference signals (RSs) in accordance with transmitting the first message; and receive, from the UE, a second message indicating one or more channel characteristics and one or more device characteristics associated with measurements of the one or more RSs.

24. The network node of claim 23, wherein the first message further indicates a respective precoding matrix indicator (PMI) and respective rank information (RI) corresponding to the uni-polarization communication state or the dual-polarization communication state in accordance with the UE changing from the first geometric configuration to the second geometric configuration, or vice versa.

25. The network node of claim 24, wherein:

the uni-polarization communication state is associated with a first rank and a first PMI;

the dual-polarization communication state is associated with a second rank and a second PMI;

the second rank is higher than the first rank; and the first PMI is different than the second PMI.

26. The network node of claim 23, wherein the one or more device characteristics include one or more of a UE geometry, placement of the antenna array architecture within the UE geometry, or an amount of feedline loss over a radio frequency (RF) connector between different antenna modules associated with the split antenna array.

* * * * *